Sept. 29, 1970  R. G. THOMPSON  3,531,402
APPARATUS AND METHOD FOR REGENERATING A WATER SOFTENING SYSTEM
Filed Jan. 17, 1969

INVENTOR.
Richard G. Thompson
BY
Merchant & Gould
ATTORNEYS

United States Patent Office 3,531,402
Patented Sept. 29, 1970

3,531,402
APPARATUS AND METHOD FOR REGENERATING A WATER SOFTENING SYSTEM
Richard G. Thompson, Stillwater, Minn., assignor to The Landa Company, a division of L & A Products, Inc., St. Paul, Minn., a corporation of Minnesota
Filed Jan. 17, 1969, Ser. No. 791,975
Int. Cl. B01d *15/06*
U.S. Cl. 210—35          10 Claims

ABSTRACT OF THE DISCLOSURE

A water softening system including a softener tank with first and second ports at the top thereof and a mineral bed therein, a brine tank, a source of untreated water, a drain and a treated water supply system and regeneration control apparatus including a valve system with a main valve for normally connecting the source of untreated water to one of the ports and the treated water supply system to the other of the parts and connecting the brine tank to the second port and the first port to the drain with an aspirator in the path to produce a flow of the brine through the mineral bed during regeneration thereof. A sensor in the drain to determine when the fluid flowing in the drain is essentially pure brine and electrical means associated therewith for closing the drain valve to cause the untreated water source to force the unused brine back into the brine tank. A backwash valve electrically operated after the brine is forced back into the brine tank and the drain valve is again opened, to cause untreated water from the source to flow through the mineral bed and out the drain to rinse the remaining salt from the system.

BACKGROUND OF THE INVENTION

Field of the invention

In the water softening field, water softeners for use in homes and the like generally consist of a softener tank containing a mineral bed which reacts with hard water flowing therethrough in an ion exchange process to provide soft water at the outlet. At periodic intervals the minerals in the tank must be cycled through a regeneration process to rebuild the softening capacity thereof. In the regeneration process, a salt solution known as a brine is delivered to the outlet of the softener tank and flows slowly backward therethrough to the inlet and out to a drain. As the brine flows through the mineral bed, another ion exchange process takes place in which sodium ions replace the hardness ions in the mineral, which hardness ions were previously taken out of the water. After a given period of time the brine solution is stopped and a fast rinse or backwash cycle in which plain water is circulated backward through the softener tank for a relatively short period of time is initiated. This backwash cycle rinses any remaining brine from the softener tank and expands the mineral bed slightly in preparation for the next softening cycle.

Description of the prior art

In the prior art various sensors are utilized to either sense a change in the condition of the mineral bed as it nears exhaustion or to detect a change in the hardness or softness of the water delivered to the soft water supply system. In each of these prior art systems a sensing element is either buried in the mineral bed or immersed in a chamber at the soft water outlet. Upon receiving a signal from the sensing element a control initiates the regeneration process either at once or through a holding relay which delays the regeneration until a time of minimum water usage. The first method is inconvenient because the regeneration could occur at any time without warning and the second method must include a reserve capacity to insure that the softener continues to function until the time of minimum water usage.

SUMMARY OF THE INVENTION

The present invention pertains to regeneration control apparatus and method for use in a water softening system, which apparatus includes differential pressure means for producing a flow of fluid, drain valve means adapted to be mounted in communication with a drain, main valve means attached to said pressure means and said drain valve means for connecting a source of untreated water to a first port in a softener tank and a second port of the softener tank to a treated water supply system in a first mode of operation and for connecting a brine tank to the second port of the softener tank and the first port of the softener tank to said drain valve means with the pressure means connected in circuit therewith in a second mode of operation, backwash valve means attached to said main valve means for bypassing the brine tank and connecting the source of untreated water to the second port of the softener tank in the second mode of operation of the main valve means, sensing means positioned in the drain for providing an indication when substantially pure brine is flowing in the drain and energization means operable upon receiving said indication from said sensing means for energizing the various valves to force unused brine back into the brine tank, backwash the softening system and return the main valve means to the first mode of operation.

It is an object of the present invention to provide new and improved regeneration control apparatus.

It is a further object of the present invention to provide a new and improved method of regenerating water softening systems.

It is a further object of the present invention to provide regeneration control apparatus utilizing a sensor in the drain to sense the complete regeneration of the mineral bed in the softener tank.

It is a further object of the present invention to provide improved regeneration control apparatus in which unused brine in the softening system is forced back into the brine tank to be utilized in the next regeneration cycle.

These and other objects of this invention will become apparent to those skilled in the art upon consideration of the accompanying specification, claims, and drawings.

BRIEF DESCRIPTION OF THE DRAWINGS

Referring to the drawings wherein like characters indicate like parts throughout the figures.

DESCRIPTION OF THE PREFERRED EMBODIMENT

Figures 1, 2:
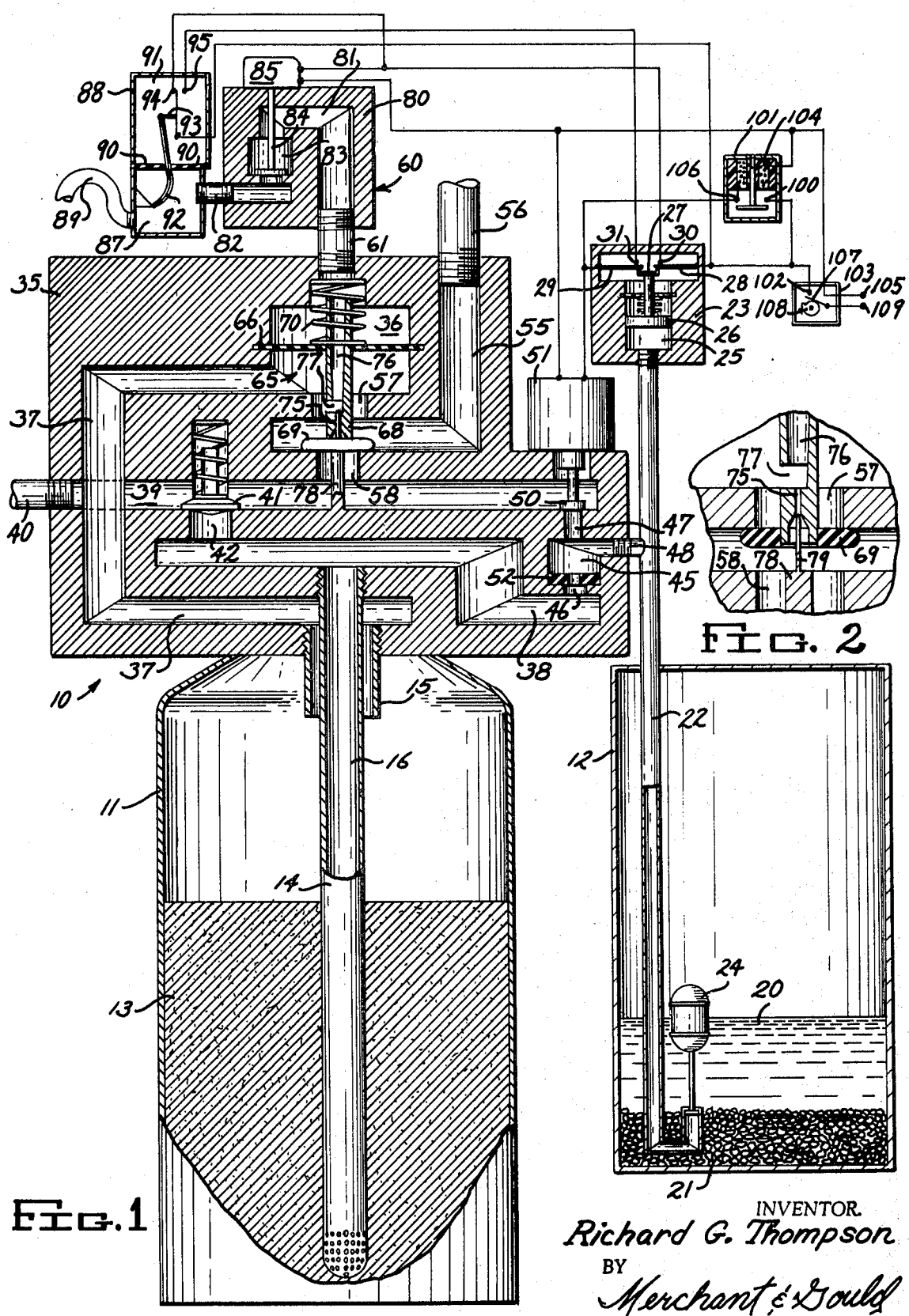
FIG. 1 illustrates a water softening system including the present regeneration control apparatus in a semi-schematic view.
FIG. 2 is an enlarged fragmentary view in section of a portion thereof.

Referring to the figures the numeral 10 generally designates regeneration control apparatus attached to a softener tank 11 and a brine tank 12. The softener tank 11 illustrated is a commercially available item having a mineral bed 13 therein to produce the softening action as hard or untreated water passes therethrough and a riser pipe 14 extending from adjacent the lower end of the softener tank 11 outwardly through a first port 15 in the top of the softener tank 11 and forming a second port 16 into the softener tank 11. In the semi-schematic illustration the control apparatus 10 is greatly enlarged relative to the softener tank 11 and brine tank 12 so that all of the details thereof can be clearly illustrated. However, it should be understood that the relative sizes of the various items are substantially similar to prior art devices.

The brine tank 12 contains a salt solution or brine 20, which may be formed in any of the well known procedures such as placing rock salt 21 in the bottom of the brine tank 12 and filling the brine tank 12 partially full of water to form a saturate solution, brine 20, thereabove. A brine line 22 extends from adjacent the bottom of the brine tank 12 upwardly through the top of the brine tank 12 to a pressure switch 23. The portion of the brine line 22 adjacent the bottom of the brine tank 12 is generally U-shaped with the end thereof extending upwardly above the rock salt 21 and having a float valve 24 therein. The float valve 24 is constructed so as to close the lower end of the brine line 22 when the level of the brine 20 reaches a predetermined value. As brine is drawn from the brine line 22 the float valve 24 opens allowing more brine 20 to enter the brine line 22. The upper ends of the brine line 22 terminate in a cylinder 25 forming a portion of the pressure switch 23. The cylinder 25 has a piston 26 therein, which moves with variations of brine pressure in the brine line 22. The piston 26 has a plate 27 connected thereto which contacts a pair of movable arms 28–29 and moves them into engagement with a pair of contacts 30–31, respectively, when the brine line 22 has sufficient pressure therein to force the piston 26 upwardly in the cylinder 25. It should be understood that other forms of brine tanks and pressure switches 23 or indicators might be utilized and the present embodiment is illustrated for convenience.

A housing 35, which may be a casting or the like, is attached to the first port 15 of the softener tank 11 so that the first port 15 is in communication with a chamber 36 through a passageway 37. Further, the second port 16 is connected in communication with a passageway 38. A passageway 39 spaced from the passageway 38 is connected to a treated water supply system (not shown) through a conduit 40. A one-way valve 41 normally closes a short passageway 42 in communication with the passageways 38 and 39. The one-way valve 41 is mounted so that fluid under pressure can flow from the passageway 38 into the passageway 39 but not in the reverse direction. A small chamber 45 is formed in the housing 35 and communicates with the passageway 38 through a short passageway 46. The chamber 45 is also in communication with the passageway 39 through a short passageway 47 and in communication with the brine line 22 through a short conduit 48. The passageway 47 is normally closed by the plunger 50 of a backwash valve 51. The passageway 46 has a flow control washer 52 mounted therein, which washer 52 is formed of some resilient material such as rubber, so that the opening therethrough is reduced in size as the pressure of the fluid flowing therethrough increases.

At least a portion of a passageway 55 lies between the chamber 36 and the passageway 39 and one end thereof is connected through a conduit 56 to a source of untreated water (not shown). The passageway 55 is in communication with the chamber 36 through a short passageway 57 and in communication with the passageway 39 through a short passageway 58. The chamber 36 is also in communication with a drain valve, generally designated 60, through a conduit 61. The conduit 61, part of chamber 36, passageway 57, part of passageway 55, passageway 58 and part of passageway 39 are positioned in overlying relationship so that a main valve generally designated 65 can be operatively mounted therein.

Main valve 65 includes a flexible diaphragm 66 mounted in the chamber 36 as to generally divide the chamber 36 into upper and lower portions thereof. An elongated stem 68 is attached to the diaphragm 66 for movement therewith and extends outwardly from either side thereof. The lower end of the stem 68 has a bib washer 69 attached thereto for movement in the passageway 55 between the upper end of the passageway 58 and the lower end of the passageway 57. A compression spring 70 is mounted above the diaphragm 66 approximately coaxially around the upper end of the stem 68 and inset slightly coaxially around the conduit 61. The spring 70 biases the diaphragm 66, the stem 68 and the bib washer 69 downwardly so that the bib washer 69 normally closes the passageway 58. When the pressure in the upper portion of the chamber 36 is substantially less than the pressure in the lower portion of the chamber 36 the diaphragm 66 moves upwardly and engages the bib washer 69 with the housing 35 so as to close the passageway 57 and open the passageway 58.

In the present embodiment an aspirator is formed in the stem 68 in the following manner. A fine, high velocity passageway 75 is formed in the stem 68 so as to extend longitudinally through the bib washer 69 and approximately mid-way up the stem 68. A larger passageway 76 is formed through the remainder of the stem 68 from the end of the high velocity passageway 75 to the upper end of the stem 68 and serves as a throat for the aspirator. An opening 77 at the end of the high velocity passageway 75 allows communication between the chamber 36 and the passageway or throat 76. Thus, when the diaphragm 66 moves the bib washer 69 into a position whereby the passageway 57 is closed water flows from the passageway 55 through the high velocity passageway 75 into the throat 76 creating a vacuum in the chamber 36 which draws fluid from the passageway 37 into the chamber 36 and the throat 76. An alongated column 78, formed as a portion of the housing 35, extends upwardly approximately in the center of the passageway 58 and closes the high velocity passageway 75 in the stem 68 when the main valve 65 is in the normal position (bib washer 69 seated in passageway 58). Thus, aspirating only occurs when the main valve 65 is in the upper mode of operation.

Referring to FIG. 2 a fragmentary detail view of a portion of the stem 68, bib washer 69 and column 78 with the surrounding passageways is illustrated. An elongated needle 79 is attached to the upper end of the column 78 in an upwardly extending position approximately coaxial with the high velocity passageway 75. The needle 79 extends through the passageway 75 each time the stem 68 and bib washer 69 move downwardly into the first position (shown in FIG. 1). This movement of the stem 68 serves as a self-cleaning action to remove foreign material from the passageway 75 and maintain the aspirator operating efficiently. In this embodiment the needle 79 also guides the movements of the stem 68 although other guide means could be included in the casting or housing 35.

The drain valve 60 is illustrated as having a separate housing or casting 80 although it should be understood that the housing 80 may be formed as a portion of the housing 35 if so desired. One end of a passageway 81 is in communication with the conduit 61 while the opposite end thereof is in communication with a conduit 82. The passageway 81 is enlarged slightly at 83 and a plunger 84 attached to a solenoid-type drain valve 85 is positioned therein for movement between a first position in which the passageway 81 is closed and a second position in which the passageway 81 is opened. The drain valve 85 is constructed so that the plunger 84 normally rests in a closed position within the passageway 81 and upon supplying the proper energy to the drain valve 85 draws the plunger 84 upwardly to open the passageway 81. While a solenoid-type drain valve 85 is illustrated in the present embodiment for convenience it should be understood that a variety of valves or other devices might be utilized to open and close the passageway 81.

The conduit 82 is in communication with a chamber 87 in a senor housing 88. The chamber 87 has a second conduit 89 extending therefrom and in communication with a drain (not shown). The conduit 89 has a trap therein so that the chamber 87 is maintained substantially full of fluid. A partition 90 in the housing 88 separates the first chamber 87 from a second chamber 91 except for an opening through the partition 90 having a sensor 92 extending therethrough. One end of the sensor 92 is affixed to the inner wall of the housing 88 in the chamber 87 and the other end thereof is affixed to an arm 93 of a single-pole double-throw switch. The sensor 92 is mounted so that the arm 93 is normally engaged with a first stationary contact 94 and upon sufficient contact of the sensor 92 in the chamber 87 with a concentrated monovalent ionized solution, such as relatively pure brine, the sensor 92 will deform to move the arm 93 into engagement with a second stationary contact 95. The sensor 92 will not move sufficiently when contacting bivalent ionized solution, such as the hardness ions from the mineral bed 13, to disengage the arm 93 from the contact 94. In the present embodiment the sensor 92 is the type described in Pat. No. 3,282,650 issued to Bannigan Nov. 1, 1966 and entitled "Ion Indicating Device." It should be understood, however, that a wide variety of sensors might be utilized including a pair of electrodes for sensing the conductivity of the solution flowing into the drain, or other types of ion exchange resin sensors.

In the electrical circuitry of the control apparatus 10, the stationary contacts 94 associated with the sensor 92 is connected to one side of the solenoid in the drain valve 85 and to the stationary contact 30 associated with the pressure switch 23. The stationary contact 95 associated with the sensor 92 is connected to the other stationary contact 31 associated with the pressure switch 23. The arm 93 associated with the sensor 92 is connected to the arm 28 associated with the pressure switch 23, to a stationary contact 100 of a solenoid switch 101 and to a stationary contact 102 of a cam operated switch 103. The opposite side of the solenoid for the drain valve 85 is connected to one side of the solenoid for the backwash valve 51, to one side of a coil 104 of the solenoid switch 101 and to a power terminal 105. The opposite side of the coil 104 for the solenoid switch 101 is connected to a second stationary contact 106 which is in turn connected to the movable arm 29 associated with the pressure switch 23 and to the opposite side of the solenoid for the backwash valve 51. The cam operated switch 103 has a movable arm 107 which is periodically moved into and out of engagement with the contact 102 by a cam 108. The movable arm 107 is connected to a second power terminal 109. The power terminals 105 and 109 are adapted to be connected to a suitable source of power, such as 110 v., 60 cycle.

In the operation of the water softening system including the control apparatus 10, a suitable source of power is applied to the power terminals 105-109, a source of pressurized untreated water is connected to the conduit 56, the conduit 40 is attached to a treated water supply system and the conduit 89 is attached to a drain. A motor (not shown) operating the cam 108 is geared so that the cam turns at the desired rate to engage the arm 107 and contact 102 at a time of minimum water usage such as two or three a.m. With the arm 107 disengaged from the contact 102 the drain valve 85 is deenergized and the plunger 84 is in a position to close the passageway 81 and the backwash valve 51 is deenergized so that the plunger 50 is in a position to close the passageway 47. The water pressure on both sides of the diaphragm 66 is approximately equal and the bib washer 69 is in a position to close the passageway 58. Thus, untreated water flows from the conduit 56 through the passageway 55, passageway 57, chamber 36, passageway 37, first port 15, mineral bed 13, riser pipe 14, second port 16, passageway 38, passageway 42, one-way valve 41, and passageway 39 to conduit 40. As the untreated water passes through the mineral bed 13 an ion exchange occurs whereby the hardness ions remain in the mineral bed 13. After a predetermined amount of time passes and regeneration of the mineral bed 13 is desirable, cam 108 causes arm 107 to engage contact 102 and apply power through arm 28 and contact 30 to the solenoid of the drain valve 85. A parallel path for energization of the solenoid of drain valve 85 is provided through the arm 93 and contact 94 associated with the sensor 92. It should be noted that the sensor 92 remains in the position illustrated until the chamber 87 fills with a concentrated monovalent ionized solution, such as relatively pure brine. Also, the brine line 22 is pressurized because the water in passageway 38 maintains a back pressure at the conduit 48. Since the brine line 22 is pressurized the piston 26 is in the position illustrated until regeneration occurs.

With the energization of the solenoid of the drain valve 85 the plunger 84 moves upwardly to open the passageway 81. Once the passageway 81 is opened the fluid pressure in the upper portion of the chamber 36 is lower than the fluid pressure in the lower portion so that the diaphragm 66 is flexed upwardly and the bib washer 69 moves into a position to close the passageway 57 and open the passageway 58. Untreated water is now free to flow from the conduit 56 through the passageway 55, passageway 58, and passageway 39 to conduit 40. Thus, untreated water is supplied to the treated water supply system during regeneration. Also, untreated water flows from the passageway 55 through the high pressure passageway 75 into the throat 76 to cause a vacuum in the chamber 36 and draw fluid from the passageway 37 into opening 77. The vacuum in the chamber 36 draws brine from the brine line 22 into the chamber 45, through the passageways 46 and 38, through the second port 16 and riser pipe 14, backward through the mineral bed 13, out the first port 15 into the passageway 37. The brine drawn into the passageway 37 passes into the opening 77 and out the drain by way of the passageway 81, conduit 82, chamber 87 and conduit 89. During regeneration the hardness ions in the mineral bed 13 are replaced by the salt ions until substantially all of the hardness ions in the mineral bed 13 are removed and flow into the drain. When regeneration is complete or substantially complete the fluid flowing through the chamber 87 into the conduit 89 and the drain is substantially pure brine and the sensor 92 is distorted sufficiently to cause the arm 93 to engage the stationary contact 95. During regeneration sufficient brine is drawn from the brine line 22 to reduce the pressure therein enough to lower the float valve 24 and open the bottom end thereof and to lower the piston 26 so that the arms 28-29 no longer engage the contacts 30-31. Thus, once the sensor 92 moves the arm 93 into engagement with the stationary contact 95 the solenoids for the drain valve 85 and the backwash valve 51 are deenergized and the passageways 81 and 47 are both closed.

Although the drain valve 85 is deenergized and the passageway 81 closed the water pressure on the lower side of the bib washer 69 is sufficient to retain the bib washer 69 in the upper position and close the passageway 57. Untreated water flows from the conduit 56 through the passageways 55 and 75 to the chamber 36 through the passageway 37, first port 15, mineral bed 13, riser pipe 14, and second port 16, and through passageways 38 and 46 into the brine line 22. Thus, unused brine is forced, by a restricted flow of fresh water, back into the brine line 22 to be used during the next regeneration cycle. When the brine 20 in the brine tank 12 reaches the predetermined level the float valve 24 closes the lower end of the brine line 22 and when the brine line 22 is sufficiently pressurized, the piston 26 moves upwardly until the arms 28-29 again engage the stationary contacts 30, and 31, respectively. Because of the trap in the conduit 89 the chamber 87 remains filled with brine and the sensor 92 remains in the distorted position. With the actuation of the pressure switch 23 by pressure in the brine line 22 the solenoids of the drain valve 85 and backwash valve 51 are both energized to raise the plungers 84 and 50, respectively, and to open the passageways 81 and 47.

With the passageways 47 and 81 open untreated water is free to flow from the conduit 56 through the passageways 55–58–39–47 into the chamber 45. Because of the flow control washer 52 in the passageway 46 a pressure is produced in the chamber 45 sufficient to retain the desired pressure on the brine line 22. The untreated water continues to flow through the passageways 46 and 38 into the second port 16 and riser pipe 14. The untreated water flows from the riser pipe 14 backward through the mineral bed 13 to act as a rinse or backwash to remove all brine therefrom. Untreated water flows from the mineral bed 13 out of the first port 15 into the passageway 37, chamber 36, through opening 77 into the passageway 76, passageway 81, chamber 87 and out the conduit 89 into the drain. Once the backwash water flows through the chamber 87 the sensor 92 will return to the illustrated position but the solenoid switch 101 serves as a locking circuit to retain the drain valve 85 and the backwash valve 51 energized until a predetermined amount of time has elapsed to insure sufficient backwashing action. This predetermined time is determined by the movement of the cam 108 and upon the turning of the cam 108 to disengage the arm 107 from the contact 102 the control apparatus 10 is deenergized and the parts thereof return to the normal or illustrated positions.

Thus, a water softening system is described which includes novel regeneration control apparatus having a sensor in the drain for terminating the regeneration of the mineral bed after the hardness ions are sufficiently removed therefrom. Further, the present system returns unused brine to the brine tank and recharges the brine tank with sufficient fluid automatically. The described method and apparatus for regenerating a water softening system is greatly improved in efficiency and operation.

What is claimed is:

1. In a water softening system having a softener tank with first and second ports and a mineral bed therein, a brine tank, a source of untreated water, a drain and a treated water supply system, regeneration control apparatus comprising:
    (a) differential pressure means having an inlet and an outlet for producing a flow of fluid;
    (b) drain valve means adapted to be mounted in communication with the drain for normally closing the drain and for opening the drain upon proper energization of said drain valve means;
    (c) main valve means operatively attached to said pressure means and said drain valve means and adapted to be connected to the brine tank, the source of untreated water and the treated water supply system for connecting the source of untreated water to the first port of the softener tank and the second port of the softener tank to the treated water supply system in a first mode of operation and for connecting the brine tank to the second port of the softener tank and the first port of the softener tank to said drain valve means with the pressure means connected in circuit therewith to provide a flow of brine from the brine tank through the softener tank into the drain in a second mode of operation;
    (d) said drain valve means and said main valve means cooperating to move said main valve means into the second mode of operation when said drain valve means opens the drain and maintain said main valve means in the first mode of operation when said drain valve means closes the drain;
    (e) backwash valve means operatively attached to said main valve means for bypassing the brine tank and connecting the source of untreated water to the second port of the softener tank upon proper energization thereof with the main valve means in the second mode of operation;
    (f) sensing means positioned in communication with the drain for providing an indication when regeneration of the mineral bed in the softener tank is substantially completed; and
    (g) energization means connected to said drain valve means, said backwash valve means and said sensing means for energizing said drain valve means at a predetermined time to open the drain and move said main valve means into the second mode of operation, said energization means further operating upon receiving the indication from said sensing means to deenergize said drain valve means and close the drain for a predetermined period of time after which the backwash valve means is energized for a period of time.

2. Regeneration control apparatus as set forth in claim 1 wherein the energization means includes a timer for starting and stopping the regeneration at predetermined times.

3. Regeneration control apparatus as set forth in claim 1 wherein the main valve means includes a diaphragm, stem and bib washer device for providing the cooperation with the drain valve means in the two modes of operation and the differential pressure means includes an aspirator in the stem thereof.

4. Regeneration control apparatus as set forth in claim 1 wherein the brine tank is connected to receive brine therein from the water softening system when the drain is closed by the drain valve means and the backwash valve means is deenergized.

5. Regeneration control apparatus as set forth in claim 1 wherein the brine tank includes a brine line in communication with the main valve means, said brine line having one end positioned in the brine tank with a float valve affixed thereto for closing said one end when the brine level in said brine tank reaches at least a predetermined height and having a closed end with a pressure switch mounted therein for providing an indication when the brine in the brine line has reached a predetermined amount.

6. Regeneration control apparatus as set forth in claim 5 wherein the pressure switch is connected to the energization means so that the predetermined period of time during which the drain valve means and the backwash valve means are deenergized is ended by the indication provided by the pressure switch.

7. A method of regenerating a water softening system, having a softening tank with first and second ports and a mineral bed therein, a brine tank, a source of untreated water, a drain and a treated water supply system normally connected with the source of untreated water in communication with the first port and the second port in communication with the treated water supply system, comprising the steps of:
    (a) connecting the brine tank to the second port and the first port to the drain with means in the path for causing a flow of brine through the softener tank into the drain to regenerate the mineral bed;
    (b) sensing at least one variable characteristic of the fluid flowing from the softener tank into the drain;
    (c) disconnecting the drain from the first port and forcing a substantial quantity of the unused brine in the softening system back into the brine tank when the variable characteristic indicates the fluid flowing into the drain is substantially pure brine;
    (d) connecting the source of untreated water to the second port and the first port to the drain for backwashing the softening system including the mineral bed for a predetermined period of time; and
    (e) connecting the softening system in the normally connected configuration.

8. A method of regenerating a water softening system as set forth in claim 7 including in addition to the step of detecting the level of brine in the brine tank to determine the amount of fluid to be forced back into the brine tank.

9. A method of regenerating a water softening system as set forth in claim 7 including in addition the step of timing the backwashing operation to insure sufficient cleansing of the softening system including the mineral bed.

10. A method of regenerating a water softening system, having a softener tank with first and second ports and a mineral bed therein, a brine tank, a source of untreated water, a drain and a treated water supply system normally connected with the source of untreated water in communication with the first port and the second port in communication with the treated water supply system, comprising the steps of:

(a) connecting the brine tank to the second port and the first port to the drain with means in the path for causing a flow of brine through the softener tank into the drain and actuating a drain valve associated with the drain to allow fluid flow therethrough;

(b) sensing the fluid flowing from the softener tank into the drain and operating a switch when said fluid is substantially pure brine;

(c) utilizing said switch operation for actuating the drain valve to close the drain and cause unused brine to flow back into the brine tank;

(d) sensing the level of brine in the brine tank and operating a second switch when the brine is at a desired level;

(e) utilizing said second switch operation to actuate a backwash valve and connect the source of untreated water to the second port and the first port to the drain and further utilizing said second switch operation to actuate the drain valve to again allow fluid flow therethrough; and (f) actuating the drain valve and the backwash valve to prevent the flow of fluid through either valve after a predetermined period of time and to return the softening system to the normal connection.

References Cited

UNITED STATES PATENTS

| 1,654,537 | 1/1928 | Dotterweich | 210—96 |
| 1,976,439 | 10/1934 | Dotterweich | 210—96 |
| 2,338,667 | 1/1944 | Riche | 210—96 |
| 3,021,276 | 2/1962 | Mast | 210—35 |
| 3,080,974 | 3/1963 | Rose | 210—140 X |
| 3,342,336 | 9/1967 | Rose | 210—140 X |

JOHN W. ADEE, Primary Examiner

U.S. Cl. X.R.

210—96, 105, 126, 140, 190